United States Patent
Werz et al.

(10) Patent No.: US 9,849,541 B2
(45) Date of Patent: Dec. 26, 2017

(54) BUTT WELDING METHOD AND FRICTION STIR WELDING TOOL

(71) Applicant: UNIVERSITAET STUTTGART, Stuttgart (DE)

(72) Inventors: Martin Werz, Dettingen (DE); Max Hossfeld, Stuttgart (DE); Oliver Volz, Stuttgart (DE)

(73) Assignee: UNIVERSITAET STUTTGART (DE)

( * ) Notice: Subject to any disclaimer, the term of this patent is extended or adjusted under 35 U.S.C. 154(b) by 0 days.

(21) Appl. No.: 15/021,930

(22) PCT Filed: Sep. 12, 2014

(86) PCT No.: PCT/EP2014/069539
§ 371 (c)(1),
(2) Date: Mar. 14, 2016

(87) PCT Pub. No.: WO2015/036562
PCT Pub. Date: Mar. 19, 2015

(65) Prior Publication Data
US 2016/0228980 A1    Aug. 11, 2016

(30) Foreign Application Priority Data

Sep. 12, 2013  (DE) .................. 10 2013 110 034

(51) Int. Cl.
*B23K 20/12* (2006.01)
*B23K 20/227* (2006.01)
*B23K 33/00* (2006.01)

(52) U.S. Cl.
CPC ........ *B23K 20/125* (2013.01); *B23K 20/1255* (2013.01); *B23K 20/227* (2013.01); *B23K 20/2275* (2013.01); *B23K 33/002* (2013.01)

(58) Field of Classification Search
CPC .. B23K 20/1255; B23K 20/122; B23K 20/22; B23K 2203/10; B23K 33/00; B23K 20/127; B23K 20/128
(Continued)

(56) References Cited

U.S. PATENT DOCUMENTS 6,471,112 B2   10/2002   Satou et al. ............... 228/112.1
6,676,004 B1*  1/2004    Trapp ................. B23K 20/1255
                                                    228/112.1
(Continued)

FOREIGN PATENT DOCUMENTS

DE      1901281    9/1964   ............ B23K 31/00
DE      10238550   3/2005
(Continued)

OTHER PUBLICATIONS

JP2000-158154 computer english translation Jul. 26, 2016.*
(Continued)

*Primary Examiner* — Erin B Saad
(74) *Attorney, Agent, or Firm* — Hayes Soloway P.C.

(57) ABSTRACT

Provided is a method and tool for butt welding a first material piece of metal to a second material piece of metal at opposed longitudinal edges. The second material piece has a greater material thickness than the first material piece. The first material piece has a higher tensile strength and/or a higher inching temperature and/or a higher yield strength and/or a higher modulus of elasticity than the second material piece. A thickened longitudinal edge is provided at the first material piece. The thickening of the longitudinal edge is at least partly produced by at least simple folding, beading or winding of the first material piece or at least partly by folding the first material piece at its edge. The two material pieces are friction-stir welded at their front along the opposed longitudinal edges.

20 Claims, 5 Drawing Sheets

(58) Field of Classification Search
USPC .................................. 228/112.1, 2.1, 114.5
See application file for complete search history.

(56) References Cited

U.S. PATENT DOCUMENTS

| | | | |
|---|---|---|---|
| 2002/0011510 A1 | 1/2002 | Enomoto ................... | 228/112.1 |
| 2002/0145031 A1 | 10/2002 | Hirano et al. ............. | 228/112.1 |
| 2003/0024965 A1* | 2/2003 | Okamura ............. | B23K 20/122 |
| | | | 228/112.1 |
| 2006/0102699 A1* | 5/2006 | Burton ................. | B23K 20/123 |
| | | | 228/112.1 |
| 2010/0068550 A1 | 3/2010 | Watson et al. ................ | 428/586 |
| 2011/0260520 A1 | 10/2011 | Schuhmacher et al. ... | 297/463.1 |

FOREIGN PATENT DOCUMENTS

| | | | |
|---|---|---|---|
| DE | 69933978 | 6/2007 | ............ B23K 20/12 |
| DE | 60128666 | 1/2008 | ............ B23K 20/12 |
| DE | 60131045 | 8/2008 | ............ B23K 20/12 |
| DE | 102009031581 | 1/2011 | |
| DE | 102010004283 | 7/2011 | ............ B23K 31/00 |
| DE | 102011013387 | 11/2011 | |
| EP | 1279458 | 1/2003 | ............ B23K 20/12 |
| EP | 1510280 | 3/2005 | ............ B23K 20/12 |
| FR | 2938782 | 5/2010 | ............ B23K 20/00 |
| JP | H10193143 | 7/1998 | ............ B23K 20/12 |
| JP | 2000158154 | 6/2000 | ............ B23K 20/12 |
| JP | 2000167676 | 6/2000 | ............ B23K 20/12 |
| JP | 2010036230 | 2/2010 | ............ B23K 20/12 |
| JP | 2010253534 | 11/2010 | ............ B23K 20/12 |

OTHER PUBLICATIONS

JP10-193143 english translation Jul. 26, 2016.*
JP2000-167676 english translation Jul. 26, 2016.*
German Office Action (w/translation) issued in application No. 10 2013 110 034.1, dated Apr. 23, 2014 (6 pgs).
International Preliminary Report on Patentability issued in application No. PCT/EP2014/069539, dated Mar. 24, 2016 (8 pgs).
International Search Report and Written Opinion issued in application No. PCT/EP2014/069539, dated Dec. 23, 2014 (20 pgs).
German Office Action (w/translation) issued in application No. 10 2013 110 034.1, dated Sep. 21, 2017 (5 pgs).

* cited by examiner

BUTT WELDING METHOD AND FRICTION STIR WELDING TOOL

FIELD OF THE INVENTION

This invention relates to a method for butt welding a first material piece of metal to a second material piece of metal at opposed longitudinal edges, wherein the second material piece has a greater material thickness than the first material piece. This invention furthermore relates to a friction stir welding tool.

BACKGROUND

In the industry, in particular the automotive industry, there is an increasing trend towards the utilization of mixed materials for the construction of vehicle bodies for weight and/or cost reasons. Typically, materials of different tensile strength, different melting temperatures and/or different yield strengths and/or different moduli of elasticity are combined with each other. The challenge consists in cohesively connecting or joining the different materials such that large forces and bending moments can be transmitted. For weight reasons, the sheet metal thicknesses furthermore should be optimized corresponding to their strength values, whereby for example steel has a smaller sheet metal thickness than aluminum.

In the prior art, such joints previously have been made from different materials by lap welding, as with lap joints good strength characteristics can be achieved. As regards the lap joints, it was found to be disadvantageous, however, that a thin gap is formed at the joint, into which moisture can penetrate. Due to the penetrating moisture and the different electric potentials of the joint partners, a corrosion cell can form, whereby the welded joint or the welded component can corrode. In addition, such joints cannot be used completely in the visible part of a product, in particular of a vehicle, as a welding seam or an overlap is to be seen, which is perceived as disturbing with regard to the appearance.

Alternatively, it is known from the prior art that two materials can be butt-welded by applying a friction stir welding method. This welding technique among other things offers the advantage that no welding seam is visible, which is perceived as disturbing. Furthermore, by means of the friction stir welding joint in contrast to the lap welding joint higher fatigue strengths can be achieved, as there is no overlap region in which notch effects occur. With the known method, however, only materials of equal material thickness can be connected with each other for different types of joint, so that the resulting strength values meet the requirements. When different materials of different material thickness would be connected with each other at their butt ends, the forces and bending moments transmittable by the joint would correspond to the strength of the material with lower strength based on the cross-section of the thinner material piece. This is due to the fact that in such joints the cross-section of the thinner material piece at the joining line is combined with the strength properties of the material with lower strength, so that the transmittable forces of the joint always are smaller than the transmittable forces of the respective material pieces.

DE 1 901 281 U describes a classical welding method in the case of a lap joint in the region of a boiler bottom, wherein the thin bottom is backed up with a sheet metal at its edge. Both are welded to the thicker jacket wall of the boiler.

In MAG welding the problem exists that a thin sheet metal can burn away very easily due to the extreme input of heat. In this case, lap welding can be made safer by bending over the edge of the sheet metal, as is proposed by DE 10 2010 004 283 A1.

Friction stir welding methods, in which two sheets of equal materials, but of different thickness, are welded to each other, are described in DE 699 33 978 T1 and JP H 10-193 143 A. These documents propose to build-up weld onto the thinner sheet metal or to glue on a further thin sheet metal of the same material.

A friction stir welding method also is shown in JP 2010-036 230 A, in which two sheets of different materials, but of the some thickness, are stir-welded by a tool which has a conically tapered pin.

It therefore is the object of the invention to create a cost-optimized method for butt welding, with which two material pieces of different materials are welded to each other, wherein the strength characteristics of the joint are improved.

SUMMARY

The invention provides a method for butt welding a first material piece of metal to a second material piece of metal at opposed longitudinal edges, wherein the second material piece has a greater material thickness than the first material piece and the first material piece is made of a material having a higher tensile strength and/or a higher melting temperature and/or a higher yield strength and/or a higher modulus of elasticity than the second material piece, wherein the following steps are carried out:
  Providing a thickened longitudinal edge at the first material piece for locally increasing the material thickness of the first material piece at the longitudinal edge, wherein the thickening of the longitudinal edge is at least partly produced by simple folding, beading or winding of the first material piece or is at least partly produced by folding the first material piece at its edge, and
  Friction stir welding of the two material pieces along the longitudinal edges opposed at their front.

The different material properties set forth above have in common that these are physical material properties which are responsible for the strength of the material pieces.

The idea underlying the invention provides that the thickness of the material piece with the smaller material thickness is increased only locally on its contact side, in order to increase the joint cross-section between the two joint partners. The joint cross-section in the joining region thus can correspond to the one which occurs in the case of two material pieces of the same material thickness. It thereby is achieved that in the case of a connection of two materials of different thickness a component with high strength characteristics can yet be produced, which also occur in a friction-stir welded component of material pieces having the same thickness. In addition, in the joint produced in this way the corrosion problem is avoided due to the existing gap, which can occur in a conventional lap welding method. The invention provides for combining materials of different tensile strength values, melting temperatures and/or yield strengths with each other, which in addition have different material thicknesses, wherein there is yet obtained a component with correspondingly high strength characteristics.

According to the invention it is provided that the thickening of the longitudinal edge is at least partly produced by simple folding, beading or winding of the first material piece. The free end of the material piece associated to the longitudinal edge is beaded over, for example, whereby the thickening is obtained at that longitudinal edge which forms the contact surface to the second material piece. Thus, the thickening of the longitudinal edge is formed integrally on the first material piece. Surprisingly, it has turned out that contrary to the prevailing doctrine, which states that a material piece cannot or only very insufficiently be welded to another material piece with its shaped region, welded components with high strength characteristics very well can be produced by the invention. Alternatively, the thickening of the longitudinal edge can at least partly be produced by folding the first material piece at its edge, in particular by folding at right angles. The fold forms a contact surface to the second material piece, via which the end-face contact is produced. The welded joint accordingly is made between the contact surface at the fold and the longitudinal edge of the second material piece. Via the fold, the cross-section of the end face of the first material piece is increased correspondingly.

Outside the thickening, the second material piece is at least twice as thick as the first one.

The invention in particular provides that the thickened longitudinal edge of the first material piece contacts the opposed longitudinal edge of the second material piece at its front, before they are welded.

The width of the thickening can lie in the range between 2 and 30 times the material thickness of the first material piece. In this way, a correspondingly strong thickening is formed, which is able to absorb the occurring forces and moments.

In particular, the thickening is at least partly formed by folding several times, in which a portion of a free edge of the starting material is located inwards between two adjacent, succeeding portions, or in which a free edge of the starting material is folded in zigzag fashion. By folding several times, the thickening of the longitudinal edge at the first material piece can become correspondingly larger. The number of folds is suggested by the relative differences in material thickness between the first and the second material piece.

The fold can have a height of 0.5 to 1.5 times the material thickness of the second material piece, in particular 0.7 to 1.3 times the material thickness. The fold hence need not exactly correspond to the material thickness of the joining partner, wherein correspondingly good strength values are achieved nevertheless.

In particular, the first material piece includes a bearing surface for the underside of the second material piece produced by folding again, which preferably has been produced by folding again at right angles. The bearing surface can form a supporting surface for the second material piece. Via the bearing surface, a lap joint between the first material piece and the second material piece additionally can be produced in the region of the bearing surface. Alternatively, the second material piece also can be welded to the bearing surface, in order to increase the stability.

According to a further aspect of the invention, the first material piece is made of a steel and the second material piece is made of a light metal or transition metal, preferably of aluminum or copper. This material combination represents the material combination typically used in vehicle construction or light-weight vehicle body construction.

The first material piece can have a material thickness smaller by at least 40% than the second material piece. It hence is ensured that the first material piece, which is formed of a material of higher strength, can be formed correspondingly thinner, whereby material is saved.

In particular, the second material piece is formed thicker by a multiple than the first material piece, so that an optimum strength-weight relation can be achieved in the produced component.

According to one aspect of the invention it is provided that the thickening is formed such that the material thickness at the thickening corresponds to the material thickness of the second material piece at the opposed longitudinal edge. This ensures that by butt welding the two material pieces, a welded joint extending over the complete and face can be produced between the two material pieces, whereby the strength characteristics of the joint are improved correspondingly. The joint cross-section in the joining region hence is optimized.

In particular, the first and/or second material piece each is a sheet metal. Sheet metals typically are used in lightweight construction, as they are particularly weight-saving.

According to a further aspect of the invention it is provided that a friction stir welding tool is used, which includes a pin which in the region of the opposed longitudinal edges penetrates into at least one material piece and has a shoulder resting on the upper side and/or on the underside of the material pieces. It hence is ensured that at least one of the two materials can be plasticized over its entire end face due to the pin, which can be formed as rotary body. In addition, mechanical pressure can be exerted on the first and/or the second material piece via the shoulder.

In particular, the length of the thickening at least corresponds to the shoulder radius of the tool used for friction stir welding, whereby it is guaranteed that the tool shoulder can rest completely on the thickening.

A further aspect of the invention provides that the pin used in the method has a contoured enveloping shell surface formed during its rotation, which substantially corresponds to the cross-sectional geometry of the end face of the thickening, in particular is concavely curved. The enveloping shell surface is formed by the points on the circumferential surface of the pin located farthest on the outside radially to the axis of rotation, so that the pin e.g. like a milling cutter has a concavely axially extending portion, which defines the enveloping shell surface, and portions radially located further on the inside.

The rotating pin, which generates the plastification of the material pieces, can rest directly against the end face of the thickening or at least has a constant distance over the entire height. This ensures that between the two material pieces a cohesive connection of uniform quality can form over the entire end face height.

According to a further aspect of the invention it is provided that the pin is moved completely or chiefly in the second material piece and/or that the pin first penetrates into the second material piece. The second material piece typically is formed as softer material, whereby the pin is easier to move in this material piece. Furthermore, the pin does not wear out so quickly in the second material piece due to the lower hardness.

A further aspect of the invention provides that the pin and the at least one supported shoulder rotate with different rotational speeds. The input of energy into the joining region thereby can be optimized, as corresponding to the existing conditions the pin rotates relative to the shoulder. The shoulder also can be formed to be standing still, so that only the pin rotates.

In particular, the in can have a distance to the first material piece which corresponds to one fifth of the diameter of the pin and/or amounts to 0.2 mm. This distance is enough to sufficiently plasticize the first material piece and nevertheless have a safety distance, so that the pin does not penetrate into the firmer first material piece and wears out.

The shoulder of the tool can have a diameter which corresponds to between 1 and 25 times the material thickness of one of the two material pieces.

The pin can have a diameter between one quarter and three quarters of the shoulder diameter.

A further aspect of the invention provides that during welding the material pieces are placed on a counter-bracket against which the tool is pressed. The counter-bracket has a step or a receiving groove which holds the first material piece at the edge of the thickening opposite to the second material piece and/or which has a depth which largely compensates the difference in the material thicknesses. Thus, the upper sides or undersides of the material pieces lie in one common plane or have a height difference which is smaller than the difference in material thickness. The step and/or the receiving groove ensure that the shoulder of the tool lies on a planar surface, whereby it is ensured that the pin can move exactly along the end face. An angular offset of the tool with respect to the material pieces thus is prevented. The height differences of the butt-weld joint between the two material pieces can be adapted to the situation by the step or the receiving groove, so that a good welded joint can be achieved.

According to a further aspect, the thickening is at least partly formed by folded portions which form layers, wherein at least two of the layers forming the thickening are spaced from each other before welding, wherein during welding the tool exerts an axial force on the thickening, which presses the layers onto each other and reduces, in particular eliminates the spacing. As a result, there can be used starting materials which have a partly beaded longitudinal edge which is closed by the tool during friction stir welding to the second material piece such that the desired material thickness of the first material piece is achieved. Furthermore, due to the final formation of the thickening during friction stir welding the cohesive connection of the layers of the thickening can be produced at the same time, for example by the energy input of the friction stir welding tool itself.

According to one aspect of the invention it is provided that the welding process is path-controlled or force-controlled. The pin thus extends corresponding to a predefined path or is adjusted to a certain maximum lateral force, so that the pin moves along the longitudinal edge of the first material piece and laterally presses against the longitudinal edge of the first material piece with the predefined force. The pin of the tool moved in a force-controlled way preferably cannot penetrate into the harder material piece.

It can possibly be provided that the pin slightly "scratches" the first material piece. When the first material piece is not liquefied, changes in the crystal structure can occur in the first material piece, wherein according to the preferred embodiment of the invention, however, the first material piece is not even brought into the pasty phase.

The method according to the invention in particular is carried out on a machine tool or, preferably, on a freely programmable industrial robot.

The invention furthermore relates to a friction stir welding tool, in particular for carrying out the method as described above, wherein the friction stir welding tool includes a pin which in the region of the opposed longitudinal edges penetrates into at least one material piece and has a shoulder resting on the upper side and/or on the underside of the material pieces, wherein the pin has a contoured, in particular concave enveloping shell surface during the rotation about its axis of rotation. The pin is formed as rotary body which rotates, in order to penetrate into the material piece. After penetrating into one of the two material pieces, the pin continues to rotate such that the immediate environment of the pin is plasticized in at least one material piece, whereby a cohesive connection between the two material pieces can be produced.

In particular, it is provided that the shoulder and the pin are rotatable relative to each other, wherein they can be driven with different rotational speeds. It thereby is achieved that the largest input of energy is achieved by the pin. For example, the shoulder also can be formed non-rotatable, whereby only the pin rotates, in order to bring about the corresponding plastification of the material pieces.

DETAILED DESCRIPTION

Figure 1:
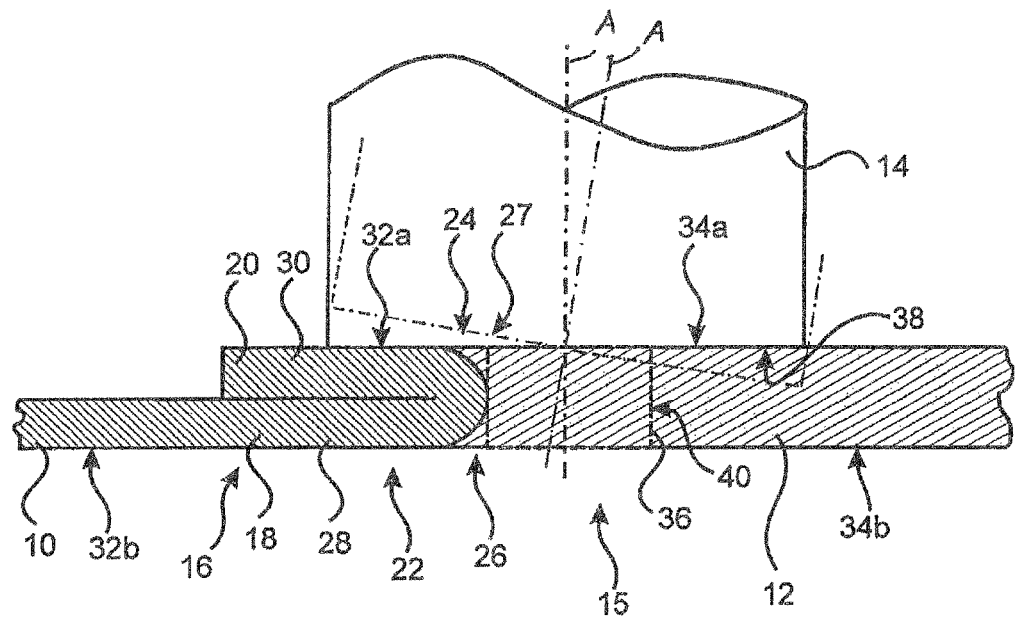
FIG. 1 shows a schematic representation of a first variant of the method according to the invention for butt welding and producing a component.

FIG. 1 schematically shows how a first material piece 10 is welded to a second material piece 12 by means of a friction stir welding tool 14, in order to form a component 15.

The second material piece 12 has a distinctly greater material thickness than the first material piece 10. Both material pieces 10, 12 are sheet metals.

In all embodiments set forth below both material pieces 10, 12 are manufactured from sheet metals, namely from sheet metals of different material. The first material piece 10 usually always is a steel sheet, whereas the second material piece 12 is a light metal or a light metal alloy or a transition metal. In particular, the second material piece 12 is made of aluminum or an aluminum alloy.

When reference subsequently is made to material thickness of the material pieces 10, 12, this is the preferably constant material thickness of the second material piece 12 and the material thickness of the first material piece 10 outside the thickening 22.

All components produced preferably are body components of a vehicle.

The first material piece 10 has a free end 16 which in the shown variant of the method is shaped to obtain a thickening 22 comprising a first portion 18 and a second portion 20, so that the two portions 18, 20 form a first layer 28 and a second layer 30 of the thickening 22. The thickening 22 thus is obtained by simple folding of the free end 16. The thickening 22, this also applies for the remaining embodiments, can be produced for example by beading or by other shaping methods.

The thickening 22 forms a longitudinal edge 24 of the first material piece 10, which at its front opposes a longitudinal edge 26 of the second material piece 12, wherein before welding the two material pieces 10, 12 can contact each other at their front with their two longitudinal edges 24, 26, which is not absolutely necessary, however, as a slight gap can also be present between the material pieces 10, 12.

A joining region 27 is formed thereby, in which the friction stir welding tool 14 plasticizes the two material pieces 10, 12, so that the friction-stir welded component 15 is obtained. In the shown variant, the second material piece 12 has a material thickness twice as large as compared to the first material piece 10, so that in the region of its longitudinal edge 24 the first material piece 10 has the same material thickness as the second material piece 12 due to the thickening 22.

This means that on the thickening the first material piece 10 forms an upper side 32a which lies in one plane with an upper side 34a of the second material piece 12, when the two material pieces 10, 12 rest on a planar surface with their undersides 32b, 34b.

Subsequent to the contacting of the two longitudinal edges 24, 26 at their front, the two material pieces 10, 12 are friction-stir welded by means of the friction stir welding tool 14, in order to form the component 15.

For this purpose, the friction stir welding tool 14 includes a pin 36 which in the illustrated representation already has rotatingly pressed into the softer second material piece 12. The pin 36 is pressed into the material piece 12 to such an extent that a shoulder 38 of the friction stir welding tool 14 rests on the upper sides 32a and 34a.

For welding the two material pieces 10, 12, the friction stir welding tool 14 moves along a predefined path in a path-controlled way or moves in a force-controlled way, in that it presses against the longitudinal edge of the first material piece with a predetermined force and moves along its longitudinal edge, so that the two material pieces 10, 12 are welded to each other.

The pin 36 usually only moves within the second material piece 12, wherein it even (an option) can have a small distance to the first material piece 10. In this case, the pin 36 cannot contact the harder first material piece 10 or only can contact it at its front such that the same remains cold enough to not even reach the pasty phase.

The pin 36 is formed as rotary body which can rotate relative to the shoulder 38 of the friction stir welding tool 14. Due to the high rotational speed of the pin 36, the regions of at least one of the two material pieces 10, 12, which are in the vicinity of the pin 36, are plasticized, so that a cohesive connection between the first material piece 10 and the second material piece 12 is obtained. A component 15 formed by cohesive connection is produced thereby.

In the shown variant, the in 36 of the friction stir welding tool 14 has an enveloping shell surface 40 formed during rotation about its axis, which is formed linear.

Due to folding of the free end 16, a convex cross-section of the first end face at the first longitudinal edge 24 is obtained at the longitudinal edge 24 of the first material piece 10. The second end face at the second longitudinal edge 26 is designed e.g. planar or convex or has a correspondingly concave cross-section which can have another curvature as the longitudinal edge 24 or the same curvature (i.e. a complementary shape). In the case of the concave design of the longitudinal edge 26, the two material pieces 10, 12 thus can fully rest against each other at their end faces before welding, which however need not necessarily be the case. There can also be a slight gap between the material pieces or a point or line contact.

Independent of the embodiment according to FIG. 1 the following applies: The space between the material pieces 10, 12, which is not filled with material, is filled on welding in that heated material of the second material piece is transported into the space. This is effected by inclining the axis of rotation A of the friction stir welding tool 14. By such tilting of the axis of rotation A, the shoulder 38 unilaterally penetrates into the second material piece 12 on the upper side 34a, in order to thereby displace material. By such displacement of the material, material of the second material piece 12 as a whole is pressed into the possibly present gap between the longitudinal edges 24, 26, in order to fill the gap (see FIG. 1). The tool can be inclined both along and transversely to the welding direction or be inclined in transverse and longitudinal direction according to a combination. The axis of rotation A can of course also extend vertically to the surfaces of the material pieces 10, 12, as likewise shown in FIG. 1, when e.g. no substantial transport of material is necessary for filling a gap.

Figure 2:
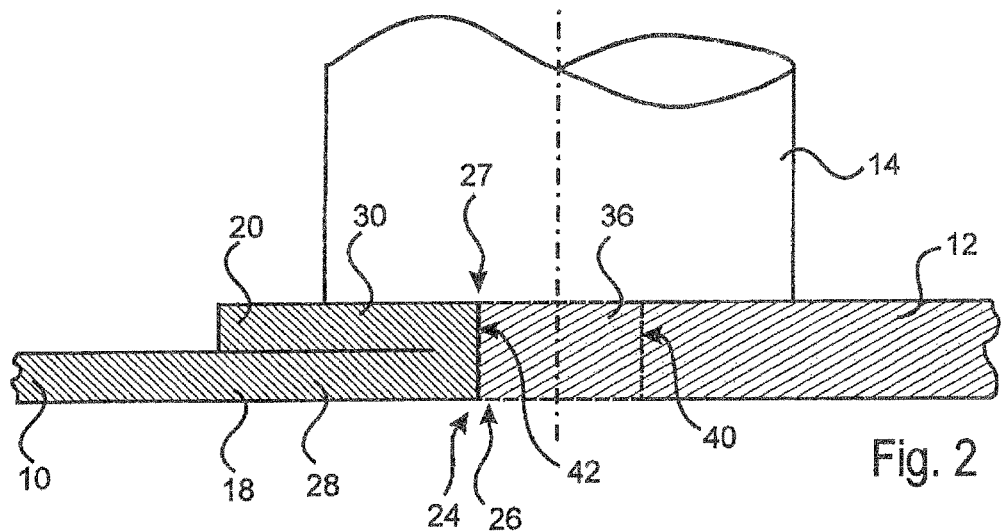
FIG. 2 shows a second variant of the method according to the invention for butt welding and producing a component.

FIG. 2 shows a second variant of the method, wherein this variant differs from the one of FIG. 1 to the effect that the end face of the first longitudinal edge 24 has been adapted to the contour of the pin 36 or its shell surface 40 obtained during rotation and each extends flatly.

The first longitudinal edge 24 is upset before contacting at its front and before welding to the second longitudinal edge 26, whereby a first contact surface 42 is obtained at the front end of the first material piece 10 or at its longitudinal edge 24. The first contact surface 42 formed in this way extends flatly.

The pin 36, which likewise forms a linear shell surface 40 upon rotation, thus is exactly adapted to the contour of the first contact surface 42, and vice versa. The cohesive connection between the first material piece 10 and the second material piece 12 thereby can be formed particularly well, as the rotating pin 36 has the same distance to the first material piece 10 and to its longitudinal edge 24 over the entire height of the joining region 27.

Figure 3:
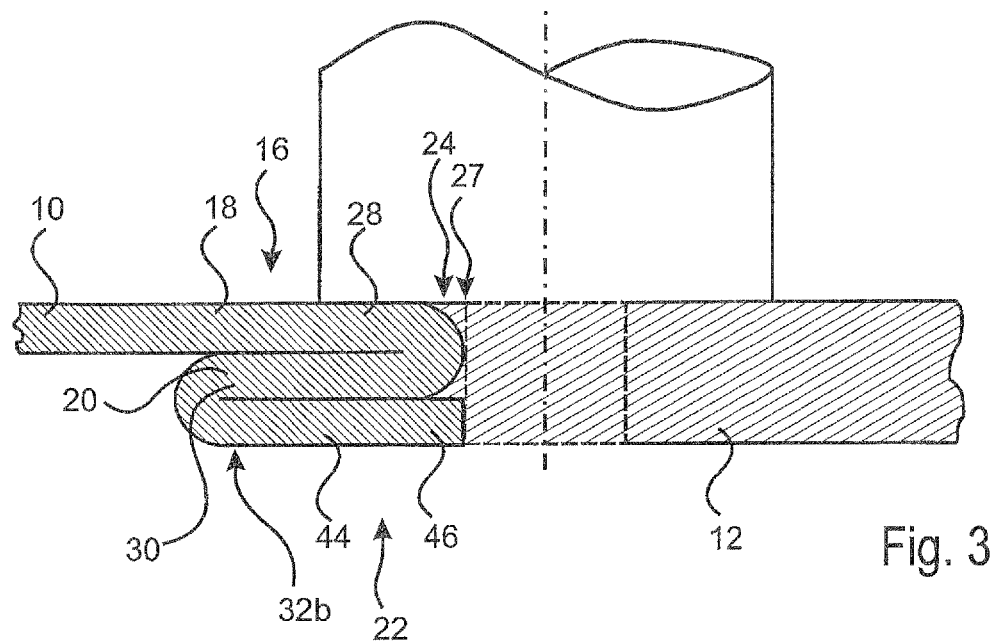
FIG. 3 shows a third variant of the method according to the invention for butt welding and producing a component.

FIG. 3 shows a third variant of the method, wherein the same differs in particular in the material thickness of the material pieces 10, 12 used.

The first material piece 10 shown here has a thickening with triple material thickness, wherein the first material piece 10 has a free end 16 which has been shaped such that it comprises a total of three portions, the first portion 18, the second portion 20 and the third portion 44.

The three portions 18, 20, 44 are formed by zigzag folding to a thickening 22, which comprises a total of three layers. The second layer 30, which is formed by the second portion 20, is arranged centrally and on both sides is surrounded by one further layer each, namely the first layer 28 as well as a third layer 46.

The third layer 46 corresponds to the third portion 44 of the folded free end 16, wherein in the shown variant the third layer 46 is formed such that it has the underside 32b.

By zigzag folding of the free end 16, a thickening 22 thus can be produced, which can compensate a difference in material thickness, no that the cross-sections of the two end faces of the material pieces 10, 12 are adjusted to each other in the joining region 27, whereby an optimum joint cross-section is obtained between the two material pieces 10, 12.

Figure 4:
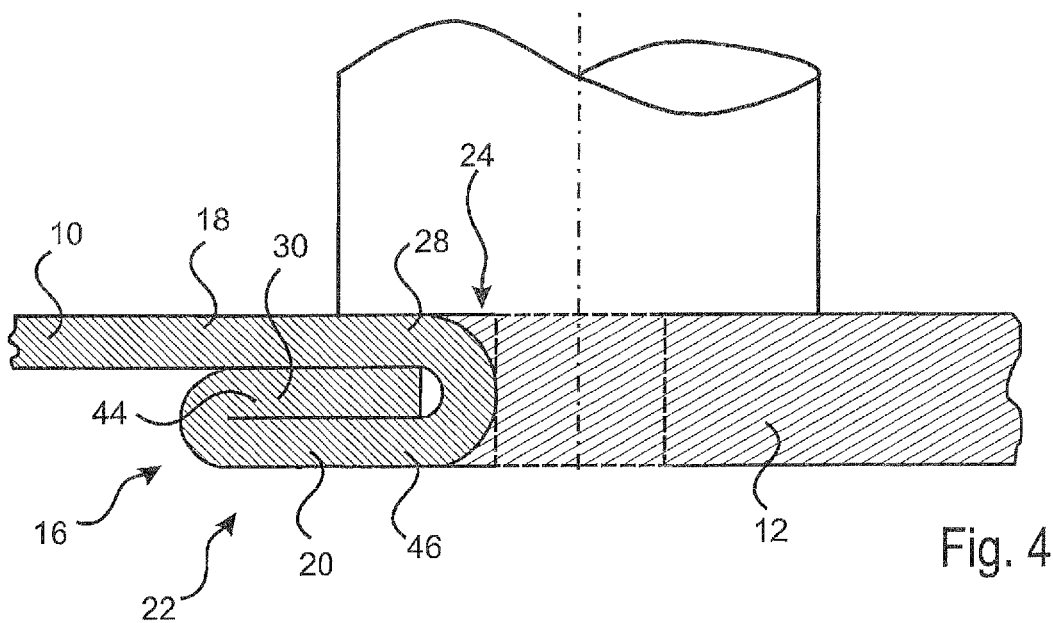
FIG. 4 shows a fourth variant of the method according to the invention for butt welding and producing a component.

FIG. 4 shows an alternative to the third variant of FIG. 3, wherein the two material pieces 10, 12 likewise have a material thickness ratio of 1:3.

In the variant shown in FIG. 4, the free end 16 shown after its shaping again includes three portions 18, 20, 44, which form the three-layer thickening 22. In contrast to the third variant, however, the portions 18, 20, 44 are arranged differently, so that the thickening 22 is constructed differently.

According to this variant, the second layer 30 of the thickening 22 is formed by the third portion 44, i.e. the end portion of the free end 16. The third and last portion 44 of the free end 16 has been folded inwards between the two succeeding portions 18, 20 as seen from the free end 16, so that on the whole a snail-shaped thickening 22 is obtained.

With the illustrated fourth variant of the method it in turn is possible to increase the material thickness of the first material piece 10 in the region of its longitudinal edge 24 such that it corresponds to the material thickness of the second material piece 12. The cross-sections in the joining region 27 are adapted to each other such that an optimum joint cross-section is obtained. In this variant, too, the longitudinal edge of the material piece 10 simply is convexly curved in cross-section. The second material piece 12 is shaped complementarily concave at its front.

Figure 5:
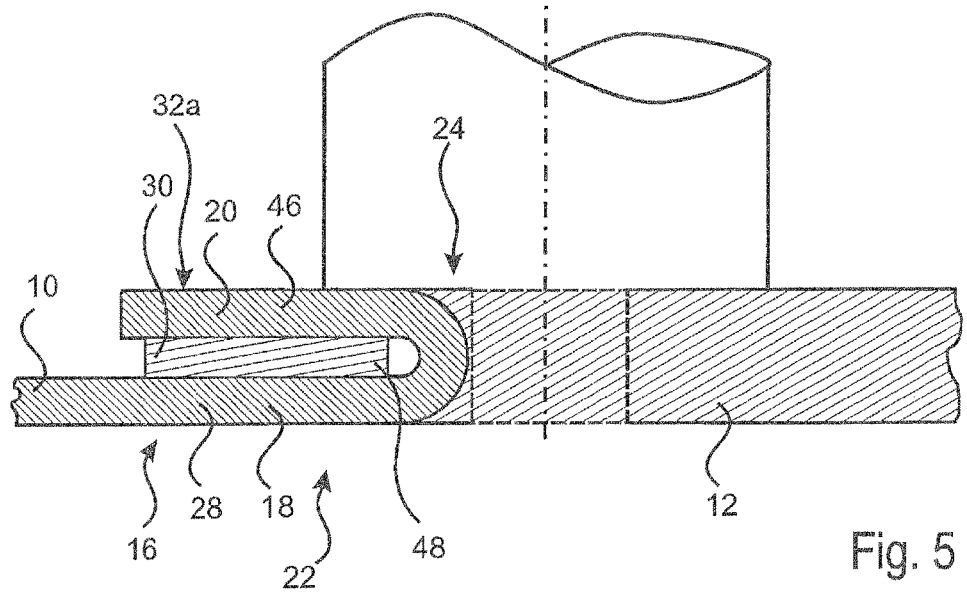
FIG. 5 shows a fifth variant of the method according to the invention for butt welding and producing a component.

FIG. 5 shows a fifth variant of the method, wherein the shaped free end 16 has two portions 18, 20 analogous to the first and the second variant. The material thickness of the second material piece 12, however, is three times as large as that of the first material piece 10, analogous to the third and fourth variants.

It nevertheless is possible that the thickening 22 of the first material piece 10 at the first longitudinal edge 24 has the same material thickness as the second material piece at the opposed second longitudinal edge 26.

This is achieved in that between the two portions 18, 20 of the shaped free end 16 an intermediate piece 48 is inserted, around which the second portion 20 is folded. The intermediate piece 48 typically is formed as separate material strip, which is frictionally or cohesively connected with at least one of the two portions 18, 20.

The intermediate piece 48 also can have another material thickness than the first material piece 10.

The thickening 22 thus again is formed with three layers analogous to the third and fourth variants. In contrast to the third and fourth variants, the first layer 28 is realized by the first portion 18 and the second layer 30 is realized by the intermediate element 48. The third layer 46 of the thickening 22 is provided by the second portion 20, which then comprises the upper side 32a.

Figure 6:
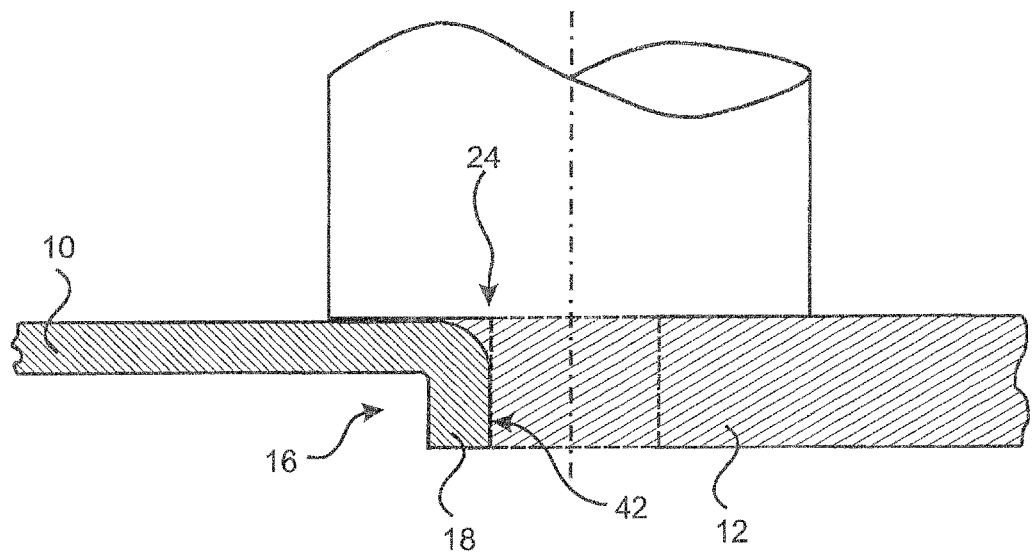
FIG. 6 shows a sixth variant of the method according to the invention for butt welding and producing a component.

FIG. 6 shows a sixth variant of the method, wherein in the sixth variant the free end 16 of the first material piece 10 is formed folded by 90°, so that the thickening 22 of the first material piece 10 at its first longitudinal edge 24 is obtained by folding the free end 16 at its edge.

By folding the free end 16, the first contact surface 42 is provided for contacting with the second material piece 12 at its front.

In the variant shown, the folding height of the free end 16 exactly corresponds to the material thickness of the second material piece 12, so that the first contact surface 42 has the same surface size as the contact surface of the second material piece 12, which however is not to be understood in a limiting sense.

In the seventh variant, the free end 16 accordingly in turn includes only one portion 18 which, however, has been folded.

Figure 7:
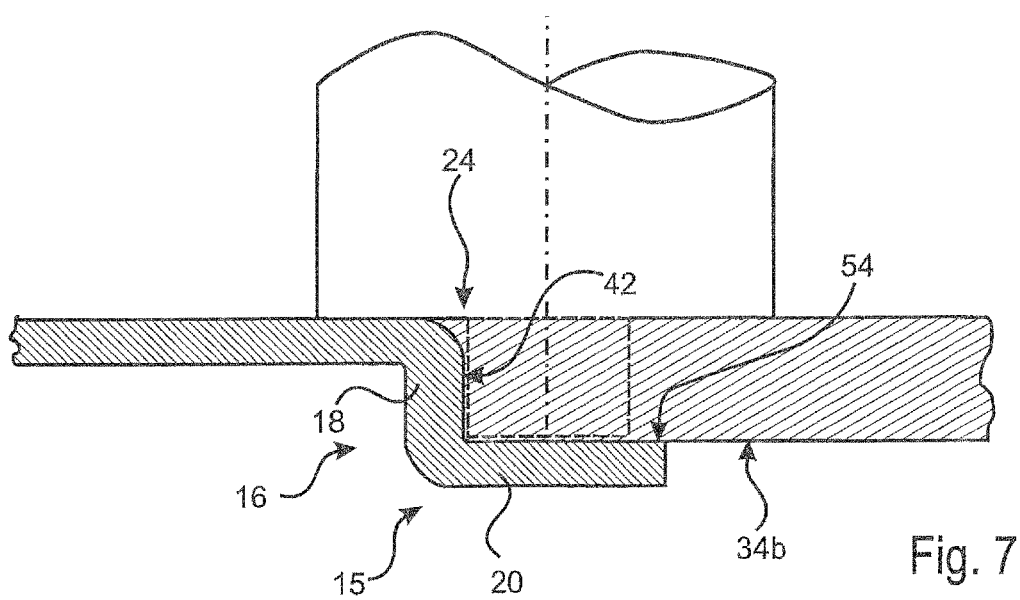
FIG. 7 shows a seventh variant of the method according to the invention for butt welding and producing a component.

FIG. 7 shows a seventh variant of the method, wherein in the shown seventh variant the free end 16 is formed by two portions 18, 20.

Analogous to the sixth variant, the first portion 18 is folded by 90° such that it forms the first contact surface 42 for the second longitudinal edge 26 of the second material piece 12.

The second portion 20 in turn is angled at about right angles to the first portion 18, wherein it extends below the second material piece 12, in order to form the bearing surface 54 for the second material piece 12, on which the underside 34b rests.

Via the bearing surface 54, a lap joint can be produced between the first and the second material piece 10, 12 or the second material piece 12 is welded to the bearing surface 54. Both serves for stabilizing the connection of the two material pieces 10, 12 and thus of the component 15.

With the variants of the method as shown in FIGS. 6 and 7 thickenings 22 can be produced, which are able to compensate any material thickness ratio between the first material piece 10 and the second material piece 12.

Figure 8:
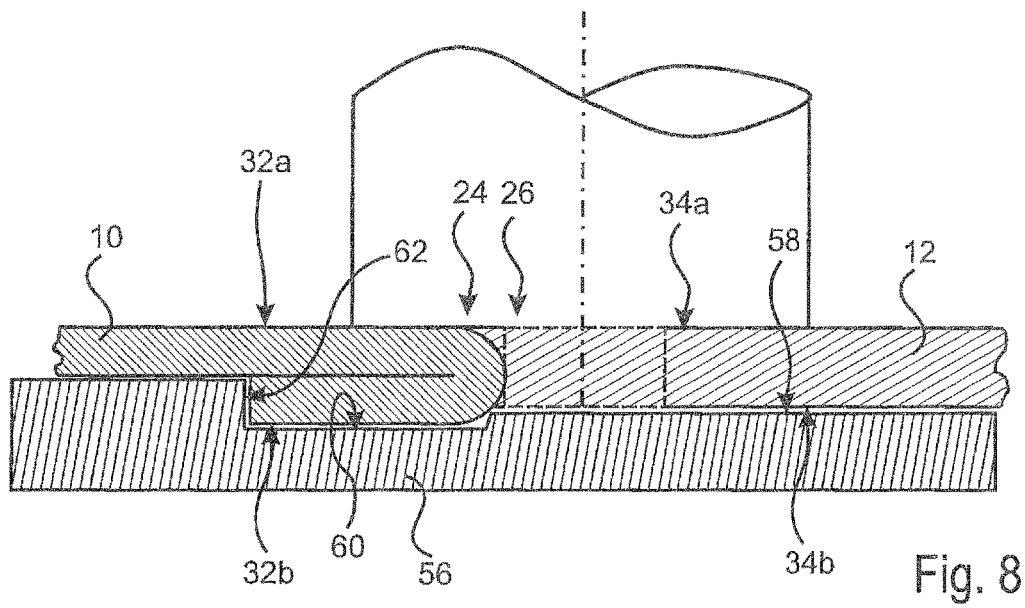
FIG. 8 shows an eighth variant of the method according to the invention for butt welding and producing a component.

FIG. 8 shows an eighth variant of the method, wherein during welding the two material pieces 10 and 12 are placed on a counter-bracket 56 which during the welding process forms a stop for the friction stir welding tool 14.

In the variant shown, the counter-bracket 56 includes a stop surface 58 on which the underside 34b rests. In the stop surface 58 a receiving groove 60 is formed, which sectionally can accommodate the thickening 22 such that the first underside 32b lies in the receiving groove 60 and is guided laterally and secured in its position.

In case the thickening 22 is formed thicker than the second material piece 12, the tool shoulder 38 nevertheless can rest flat on the upper sides 32a, 34a of the two material pieces 10, 12, so that the pin 36 is aligned exactly vertically.

Alternatively it can also be provided that the counter-bracket 56 includes a step instead of the receiving groove 60, in case the thickening 22 is formed less thick than the second material piece 12.

Furthermore, the counter-bracket 56 includes an axial stop 62 which axially positions the first material piece 10 such that at its front it rests against the opposed longitudinal edge 26 of the second material piece 12 with its first longitudinal edge 24. The two material pieces 10, 12 thus are fixingly aligned to each other in axial direction.

Figure 9:
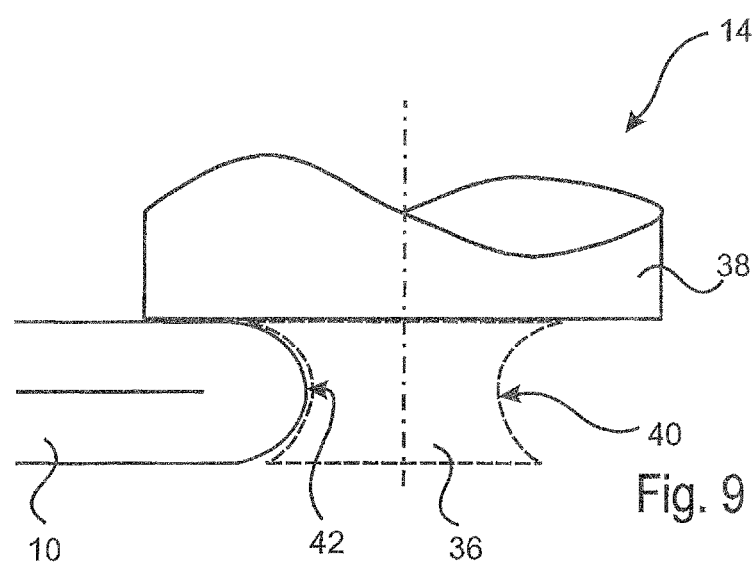
FIG. 9 shows a schematic representation of the friction stir welding tool according to the invention.

FIG. 9 shows the friction stir welding tool 14, which includes the in 36 which has a contoured enveloping shell surface 40 obtained during its rotation.

The shell surface 40 is adapted in cross-section to the cross-sectional geometry of the first contact surface 42 of the first material piece 10, which is formed of a harder material. The friction stir welding tool 14 or the pin 36 thus have an almost constant distance to the first material piece 10 over the entire height of the welded joint.

With its shoulder 38, the friction stir welding tool 14 can rest on the upper sides 32a, 34a and on the undersides 32b, 34b.

Furthermore, it is also possible to provide a tool with two shoulders, which between themselves accommodate the material pieces 10, 12 and rest against the upper side and the underside, so that a counter-bracket becomes unnecessary.

Furthermore, the two material pieces 10, 12 can be friction-stir welded from both sides at the same time or one after the other, in order to form the component 15.

With the different variants of the method it is possible to connect two material pieces 10, 12 of different material thickness and different material properties with each other such that a component 15 with high strength values is obtained, which nevertheless is lightweight.

In the automotive industry, steel sheet metals with a thickness of 0.75 mm and aluminum sheets with a material thickness of 1.5 mm typically are used.

At such a material thickness ratio of 1:2 an increase of the tensile strength by a factor of 2 is obtained, based on the aluminum sheet, in contrast to material pieces butt-welded directly.

Figure 10:
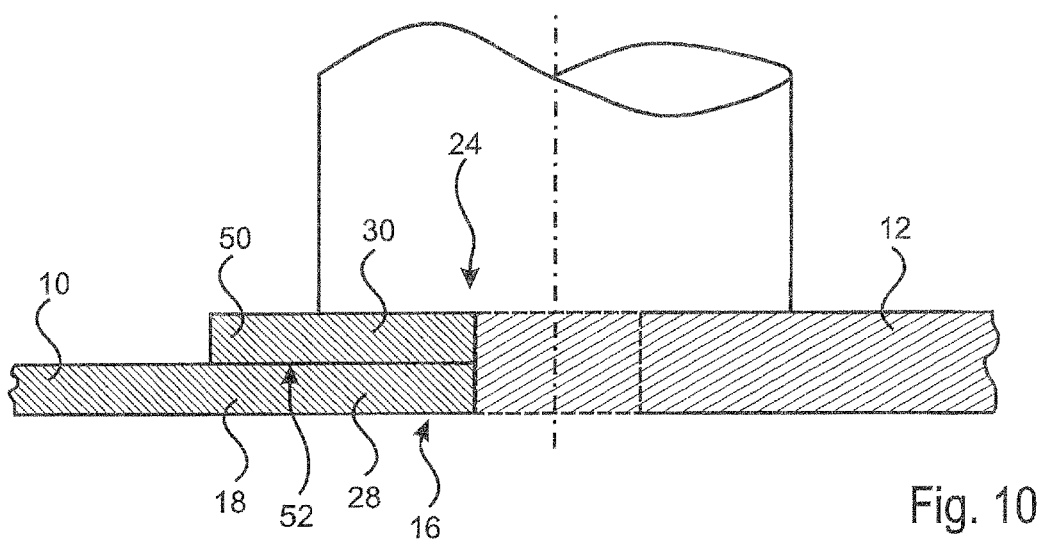
FIG. 10 shows a variant of the method not falling under the invention for butt welding and producing a component.

FIG. 10 shows a variant not falling under the scope of protection of the present patent, in which the thickening 22 is produced by a further material strip 50 which is connected with the first material piece 10 via at least one connecting point 52.

The invention claimed is:

1. A method for butt welding a first material piece of metal to a second material piece of metal at opposed longitudinal edges, using a friction stir welding tool wherein the second material piece has a greater material thickness than the first material piece and the first material piece is made of a material having at least one of a higher tensile strength, a higher melting temperature, a higher yield strength and a higher modulus of elasticity than the second material piece, comprising the following steps:
   a) Providing a thickened longitudinal edge at the first material piece for locally increasing the material thickness of the first material piece at the longitudinal edge, wherein the thickening of the longitudinal edge is at least partly produced by one of simple folding, beading or winding of the first material piece or is at least partly produced by folding the first material piece on itself at its edge, and
   b) Friction stir welding of the two material pieces along the longitudinal edges facing each other at their front, wherein the friction stir welding tool includes a rotating pin which in the region of the opposed longitudinal edges penetrates essentially only into the second material piece, and wherein the thickness extends along a direction which is substantially parallel to an axis of rotation of the friction stir welding tool used for friction stir welding.

2. The method according to claim 1, wherein between steps a) and b) the following step is provided:
   end-face contacting of the thickened longitudinal edge of the first material piece with the opposed longitudinal edge of the second material piece.

3. The method according to claim 1, wherein the thickening is at least partly formed by folding several times, in which a portion of a free end of the starting material is located inwards between two adjacent, succeeding portions.

4. The method according to claim 1, wherein a free end of the starting material is folded in zigzag fashion.

5. The method according to claim 1, wherein the first material piece includes a bearing surface for an underside of the second material piece produced by folding.

6. The method according to claim 1, wherein the first material piece is made of a steel and the second material piece is made of one of a light metal, transition metal and their alloys.

7. The method according to claim 1, wherein the first material piece has a material thickness smaller by at least 40% than the second material piece.

8. The method according to claim 1, wherein the thickening is formed such that the material thickness at the thickening corresponds to the material thickness of the second material piece at the opposed longitudinal edge.

9. The method according to claim 1, wherein at least one of the first and the second material piece each are a sheet metal.

10. The method according to claim 1, wherein at its longitudinal edge to be welded the first material piece has a convex end face as seen in cross-section, wherein at the opposed longitudinal edge the second material piece has a correspondingly concave end face, and wherein both material pieces fully rest against each other before welding.

11. The method according to claim 1, wherein the friction stir welding tool includes a rotating pin has at least one shoulder resting on the upper side or underside of the second material piece.

12. The method according to claim 11, wherein a periphery of the rotating pin has a contour which substantially corresponds to a cross-sectional geometry of an end face of the thickening opposite to the second material piece.

13. The method according to claim 1, wherein the pin is moved mainly in the second material piece.

14. The method according to claim 11, wherein the pin and the at least one supported shoulder are driven with different rotational speeds.

15. The method according to claim 1, wherein during welding the material pieces are placed on a counter-bracket against which the tool is pressed, wherein the counter-bracket has one of a step and a receiving groove which holds the first material piece at the longitudinal edge of the thickening opposite to the second material piece.

16. The method according to claim 1, wherein during welding the material pieces are placed on a counter-bracket against which the tool is pressed, wherein the counter-bracket has one of a step and a receiving groove which has a depth which compensates the difference in material thickness of the material pieces, so that the upper sides or undersides of the material pieces associated to the counter-bracket lie in one common plane or have a height difference which is smaller than the difference in material thickness.

17. The method according to claim 1, wherein the thickening is at least partly formed by folded portions which form layers, and that at least two of the layers forming the thickening are spaced from each other before welding, and that during welding an axial force is exerted by the tool on the thickening, which presses the layers onto each other and reduces, in particular eliminates the spacing.

18. The method according to claim 1, wherein the second material piece is unfolded, the friction welding tool has a pin which is pressed only into the second material piece, and the welding process is one of path-controlled and force-controlled.

19. A method for butt welding a first material piece of metal to a second material piece of metal at opposed longitudinal edges, using a friction stir welding tool wherein the second material piece has a greater material thickness than the first material piece and the first material piece is made of a material having at least one of a higher tensile strength, a higher melting temperature, a higher yield strength and a higher modulus of elasticity than the second material piece, comprising the following steps:
   a) Providing a thickened longitudinal edge at the first material piece for locally increasing the material thickness of the first material piece at the longitudinal edge, wherein the thickening of the longitudinal edge is at least partly produced by one of simple folding, beading or winding of the first material piece or is at least partly produced by folding the first material piece on itself at its edge, and b) Friction stir welding of the two material pieces along the longitudinal edges facing each other at their front, wherein the friction stir welding tool includes a rotating pin which in the region of the opposed longitudinal edges penetrates essentially only into the second material piece, and wherein the first material piece is made of a steel and the second material piece is made of one of a light metal, transition metal and their alloys.

20. A method for butt welding a first material piece of metal to a second material piece of metal at opposed longitudinal edges, using a friction stir welding tool wherein the second material piece has a greater material thickness than the first material piece and the first material piece is made of a material having at least one of a higher tensile strength, a higher melting temperature, a higher yield strength and a higher modulus of elasticity than the second material piece, comprising the following steps:

a) Providing a thickened longitudinal edge at the first material piece for locally increasing the material thickness of the first material piece at the longitudinal edge, wherein the thickening of the longitudinal edge is at least partly produced by one of simple folding, beading or winding of the first material piece or is at least partly produced by folding the first material piece on itself at its edge, wherein the second material piece remains unfolded, and b) Friction stir welding of the two material pieces along the longitudinal edges facing each other at their front, wherein the thickness extends along a direction which is substantially parallel to an axis of rotation of the friction stir welding tool used for friction stir welding, wherein the friction stir welding tool has a pin which is pressed only into the second material piece.

* * * * *